United States Patent Office

3,810,986
Patented May 14, 1974

3,810,986
NOVEL METHOD AND COMPOSITION
Bo Thuresson af Ekenstam, Bror Arne Thalen, and Axel Karl Gunnar Aberg, Molndal, and Karl Goran Claeson, Goteborg, Sweden, assignors to AB Bofors, Bofors, Sweden
No Drawing. Filed Dec. 6, 1971, Ser. No. 205,307
Int. Cl. A61k 27/00
U.S. Cl. 424—267   7 Claims

ABSTRACT OF THE DISCLOSURE

This invention relates to a novel process for the production of the D-(—)-hydrochloride salt of mepivacaine. This invention also relates to the discovery that the D-(—)-hydrochloride salt of mepivacaine exhibits unexpectedly superior properties for the treatment of arrhythmic disorders of human and animal hearts. D-(—)-mepivacaine hydrochloride can also be referred to as D(—)-methyl pipecolic acid-2′,6′-xylidide hydrochloride.

BACKGROUND

It has previously been very difficult to obtain the D-(—)-isomers of salts of mepivacaine. The D-(—)-isomer of mepivacaine hydrochloride has previously been prepared by resolution of the racemate by means of optically active (—)-tartaric acid. This process, however, is quite difficult to carry out and is extremely uneconomical since the (—)-tartaric acid isomer is very expensive. Furthermore, prior art workers have never found that this isomer has any unexpected therapeutic properties as compared to the racemate and the other isomer.

THE PRESENT INVENTION

Considered from one aspect the process of the present invention involves producing D-(—)-mepivacaine hydrochloride by replacing the active hydrogen of the —NH group of D-(+)-pipecolic acid with carbonylbenzoxy group; reacting the acid with isobutyl chloroformate to form the mixed acid anhydride; then reacting said mixed acid anhydride with 2,6-dimethyl aniline; reducing with hydrogen to remove the carbonylbenzoxy group; N-methylating; obtaining D-(+)-mepivacaine, and treating with HCl.

More particularly the process of the present invention involves the following steps:

(a) reacting D-(+)-pipecolic acid with benzylchlorocarbonate to replace the active hydrogen of the —NH group of the D-(+)-pipecolic acid with a carbonylbenzoxy group;
(b) reacting the product of step (a) with isobutyl chloroformate to form the mixed acid anhydride;
(c) then reacting the product of step (b) with 2,6-dimethyl aniline;
(d) reducing with hydrogen to remove the carbonylbenzoxy group to replace it with hydrogen, thereby obtaining D-(—)-pipecolic acid-2′,6′-xylidide;
(e) methylating said D-(—)-pipecolic acid-2′,6′-xylidide to replace the active hydrogen of the —NH group of the pipecolic acid moiety of said xylidide with a methyl group, and
(f) reacting the product of step (e) with HCl and recovering D-(—)-methyl pipecolic acid-2′,6′-xylidide hydrochloride.

In addition to the above process, we have discovered that D-(—)-mepivacaine hydrochloride has unexpectedly good therapeutic properties insofar as the treatment of arrhythmic disorders of human and animal hearts is concerned. D-(—)-mepivacaine hydrochloride may be administered in a number of different ways. It is preferably administered intravenously as an aqueous preparation. It may be dissolved in water, in glucose injection solutions, sodium chloride injection solutions, dextran injection solutions or the like. It may also be admixed with another carrier normally used in pharmaceutical preparations and administered as a tablet, powder or capsule. The concentration of D-(—)-mepivacaine hydrochloride in an aqueous solution is preferably within the range of about 0.01% to about 12% by weight. The daily dosage of D-(—)-mepivacaine hydrochloride for the treatment of arrhythmic disorders should be about 1 to 6 mg./kg. of body weight and preferably 1 to 4 mg./kg. of body weight.

EXAMPLES

The following examples are illustrative of several embodiments of the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric, unless otherwise indicated.

EXAMPLE 1

Preparation of D-(—)-mepivacaine hydrochloride (A) Preparation of D-(+)-carbobenzoxy-pipecolic acid.—To a solution of 11.5 parts of D-(+)-pipecolic acid in 25 parts by volume of a 4 molar aqueous sodium hydroxide solution, 15.3 parts of benzylchlorocarbonate was added dropwise at a temperature of 5–10° C. over a period of 30–60 min. The pH was adjusted to 11 by the addition of a 4 molar aqueous sodium hydroxide solution. After 1 hour, the mixture was extracted with 3×30 parts by volume of ether. The combined extracts were washed once with 20 parts by volume of water. The wash water was combined with the mother liquor from the extraction and 2 molar hydrochloric acid was added to obtain a pH of 1.8–2.2. The aqueous phase was then extracted with 3×40 parts by volume of ethyl acetate. The combined ethyl acetate extracts were washed twice with 1 molar aqueous hydrochloric acid solution and once with water. The organic phase was then dried and the volume was reduced in vacuo. After addition of petroleum ether until cloudiness and refrigeration, D-(+)-carbobenzoxy pipecolic acid crystallized. The D-(+)-carbobenzoxy pipecolic acid was recrystallized from an ethyl acetate-petroleum ether solution and had a melting point of 110 to 112° C. $[\alpha]_D^{24} = +41.90°$ (C=0.8; 96% ethanol). Yield: 21.4 parts.

(B) Preparation of D-(+)-carbobenzoxy-pipecolic acid-2′,6′-xylidide.—5.5 parts of isobutyl chloroformate was added dropwise at —7° C. to a solution of 10.5 parts of D-(+)-carbobenzoxy pipecolic acid and 4.0 parts of triethyl amine in 100 parts by volume of tetrahydrofurane. The solution was left at —7° C. for 15 minutes and then 4.8 parts of 2,6-dimethylaniline was added. The reaction mixture was left overnight at room temperature. The triethylamine hydrochloride which was formed was filtered off and the filtrate was evaporated in vacuo. The residue was then dissolved in 100 parts by volume of ethyl acetate. The solution was then washed with 3×10 parts by volume of a potassium bicarbonate solution (5%), 10 parts by volume of a 1 molar hydrochloric acid solution, and finally with 10 parts by volume of water. After drying the solution was concentrated and petroleum ether was added until cloudiness. A crystalline product was obtained after refrigeration and was recrystallized from ethyl acetate-petroleum ether solution. 8.3 parts of D-(+)-carbobenzoxy pipecolic acid-2',6'-xylidide was obtained from the recrystallization. This material had a melting point of 125.5 to 126.5° C., and $[\alpha]_D^{24}=+60.86°$ (C=0.3; 96% ethanol).

The potassium bicarbonate solution from the above washing was acidified with a 2 molar aqueous hydrochloric acid solution to pH 1.8–2.2 whereby 2.7 parts of D-(+)- carbobenzoxy pipecolic acid with a melting point of 112 to 112.5° C., and $[\alpha]_D^{24}=+41.90$ (C=1; 96% ethanol) was obtained.

(C) Preparation of D-(—)-pipecolic acid-2',6'-xylidide.—To a solution of 5.1 parts of D-(+)-carbobenzoxy pipecolic acid-2',6'-xylidide in 50 parts by volume of ethanol was added a suspension of 0.6 part of palladium (5% on carbon) in 10 parts by volume of acetic acid. The calculated amount of hydrogen gas was introduced into the solution at room temperature and at atmospheric pressure. The palladium catalyst was filtered off, the filtrate was concentrated and petroleum ether was added until cloudiness. After refrigeration 3.7 parts of D-(—)-pipecolic acid-2',6'-xylidide acetate having a melting point of 174° to 175° C. was obtained. The acetate was dissolved in 40 parts by volume of water and 2.7 parts of D-(—)-pipecolic acid-2',6'-xylidide was liberated by adjusting pH to 9–10 with 10% aqueous ammonia. The product had a melting point of 130 to 130.5° C., and $[\alpha]_D^{24}=-9.40°$ (C=1; 96% ethanol).

(D) Preparation of D-(+)-1-methyl pipecolic acid-2', 6'-xylidide.—A solution of 0.65 parts of D-(—)-pipecolic acid-2',6'-xylidide and 0.7 part by volume of formalin in 10 parts by volume of benzene was boiled until the water separation had ceased. The reaction mixture was then evaporated in vacuo and 0.8 part by volume of formic acid was added to the residue. The mixture was then left on a boiling water-bath overnight. The reaction mixture (which was dark brown) was then suspended in 200 parts of water and acidified with 2 parts by volume of concentrated hydrochloric acid. The solution was extracted once with ether to remove non-basic impurities, treated with activated carbon and the aqueous phase was precipitated with 15% aqueous ammonia. 0.50 part of D-(+)-1-methyl pipecolic acid-2',6'-xylidide was obtained. This product had a melting point of 150.5 to 151° C. and $[\alpha]_D^{24}=+60.46°$ (C=0.5; 96% ethanol).

(E) Preparation of D-(—)-1-methyl pipecolic acid-2', 6'-xylidide hydrochloride.—0.30 part of D-(—)-1-methyl pipecolic acid-2',6'-xylidide hydrochloride was precipitated by introducing dry hydrogen chloride into a solution of 0.35 part of D-(+)-1-methyl pipecolic acid-2',6'-xylidide in a small volume of absolute ethanol to obtain a pH of 3.5–4.0. The product has a melting point of 276 to 278° C., $[\alpha]_D^{24}=-17.30°$ (C=0.6; H$_2$O).

EXAMPLE 2

This example sets forth a process whereby the L-(+)-mepivacaine hydrochloride is obtained along with an alternative process to the novel process of the present invention for obtaining the D-(—)-mepivacaine hydrochloride.

(A) Preparation of L-(+)-1-methyl pipecolic acid-2',6'-xylidide hydrochloride.—A mixture of 346.8 parts of DL-1-methyl pipecolic acid-2',6'-xylidide and 272.0 parts of D-(—)-quinic acid was dissolved in 1400 parts by volume of boiling absolute ethanol. This solution was left at room temperature overnight to crystallize. 292 parts of crystallized L-1-methyl pipecolic acid-2',6'-xylidide-D-quinate was filtered off. The material has $[\alpha]_D^{25}=-8.4$ (C=2; H$_2$O). After two recrystallizations from absolute ethanol, a maximum rotation $[\alpha]_D^{25}=-7.1°$ (C=2.8; H$_2$O) was achieved.

The quinate was then dissolved in water and the base was precipitated with 15% aqueous ammonia solution. 110.3 parts of L-(—)-1-methyl pipecolic acid-2',6'-xylidide was obtained. This material had $[\alpha]_D^{25}=-64.8°$ (C=1.8; 96% ethanol).

This base was then dissolved in 400 parts by volume of ether. 122.4 parts of L-(+)-1-methyl pipecolic acid-2',6'-xylidide hydrochloride was precipitated by the dropwise addition of ether saturated with hydrogen chloride. This product had a melting point of 281–282° C. and $[\alpha]_D^{25}=+18.7°$ (C=2.1; H$_2$O).

(B) Preparation of D-(—)-1-methyl pipecolic acid-2', 6'-xylidide hydrochloride.—The mother liquor obtained after the above filtering off of the L-1-methyl pipecolic acid-2',6'-xylidide-D-quinate was made alkaline (pH 9–10) with 10% aqueous ammonia solution. 156.2 parts of a crude D-(+)-1-methyl pipecolic acid-2',6'-xylidide precipitated. This material had $[\alpha]_D^{25}=+58.2°$ (C=2.0; 96% ethanol). The crude product was recrystallized two times from methanol-water (5:3) solution whereby 124.2 parts of base were obtained. This product had $[\alpha]_D^{25}=+64.5°$ (C=2.4; 96% ethanol).

D-(—)-1-methyl pipecolic acid - 2',6' - xylidide hydrochloride was prepared by adding ether saturated with hydrogen chloride dropwise to a solution of the base in 5000 parts by volume of ether. 139.3 parts of the product were obtained. This product had a melting point of 280 to 281° C., and $[\alpha]_D^{25}=-18.8°$ (C=2.4; H$_2$O).

EXAMPLE 3

Use of D-(—)-mepivacaine hydrochloride for treatment of arrhythmic disorders of the heart Many different substances have been used for the treatment of arrhythmic disorders of human hearts. Among such substances is the well known local analgetic, lidocaine, which has been found to give very good results. The novel composition of this invention was compared with lidocaine.

Ventricular tachycardia was induced in dogs (male and female, 7–12 months old and weighing 14–18 kg.) by intravenous administration of g-strophantine 40 μg./kg. initially and then 10μg./kg. every 15 minutes until ventricular arrhythmia developed. Thereafter the different isomers of mepivacaine hydrochloride and lidocaine were administered in the form of aqueous solutions (2%) in the total dosages given in Table 1 below. The time from the total disappearance of VES (ventricular extra systolies) to the appearance of three consecutive VES was measured in seconds and is set forth in Table 1. The number of tests with the respective substances are given in parenthesis.

TABLE 1

| Dosage | 1 mg./kg. | | 2 mg./kg. | | 4 mg./kg. | |
|---|---|---|---|---|---|---|
| D-(—)-mepivacaine hydrochloride | 115±22 | (n=21) | 191±24 | (n=21) | 624±125 | (n=15) |
| L-(+)-mepivacaine hydrochloride | 45±10 | (n=7) | 96±15 | (n=15) | 485±98 | (n=7) |
| DL-mepivacaine hydrochloride | 48±15 | (n=7) | 97±13 | (n=25) | 445±103 | (n=7) |
| Lidocaine | 49±8 | (n=21) | 88±8 | (n=21) | 243±43 | (n=10) |

The intravenous toxicity values of the different substances are as follows:

| | LD$_{50}$, mg./kg. | |
|---|---|---|
| | Mice | Rats |
| D-(—)-mepivacaine HCl | 35±3 | 35±4 |
| L-(+)-mepivacaine HCl | 34±4 | 37±3 |
| DL-mepivacaine HCl | 32±3 | 36±4 |
| Lidocaine | 29±3 | 31±3 |

Table I shows that D-(—)-mepivacaine hydrochloride has anti-arrhythmic properties that are quite superior to those of the racemate, the other isomer and lidocaine. This was very unexpected and surprising especially as the D-(—)isomer in the normal application for mepivacaine hydrochloride, local analgetic, has properties that are quite inferior to those of the other isomer and the racemate.

Although the foregoing discussion has been largely directed to D-(—)-mepivacaine hydrochloride, the novel steps which constitute the process of this invention are equally applicable to the production of other acid addition salts, as those skilled in this art will appreciate. For instance, instead of hydrochloric acid it is possible to use inorganic acids such as sulfuric acid and carbonic acid, or organic acids such as acetic acid, citric acid, oxalic acid, etc. This also holds true for therapeutic compositions of D-(—)-mepivacaine hydrochloride and the method of using such compositions.

What is claimed is:

1. A method for treating ventricular tachycardia of human and animal hearts which comprises administering a therapeutically effective amount of D-(—)-mepivacaine hydrochloride.

2. The method of claim 1 which comprises administering a composition consisting essentially of an aqueous solution containing 0.01 to about 12% by weight.

3. The method of claim 1 wherein the daily dosage of D-(—)-mepivacaine hydrochloride is about 1 to 6 mg./kg. of body weight.

4. The method of claim 1 wherein the daily dosage of D-(—)-mepivacaine hydrochloride is 1 to 4 mg./kg. of body weight.

5. The method of claim 2 wherein the daily dosage of D-(—)-mepivacaine hydrochloride is about 1 to 6 mg./kg. of body weight.

6. The method of claim 2 wherein the daily dosage of D-(—)-mepivacaine hydrochloride is 1 to 4 mg./kg. of body weight.

7. A composition for the daily administration of an effective amount from about 1 to about 2 mg./kg. of body weight for the treatment of ventricular tachycardia which consists essentially of an aqueous solution containing 0.01 to about 12% by weight of D-(—)-mepivacaine hydrochloride.

References Cited

Grollman, Pharmacology & Therapeutics, 6th ed. (1965) pp. 472–473.

STANLEY J. FRIEDMAN, Primary Examiner